US012310525B2

(12) United States Patent
Tibbe

(10) Patent No.: US 12,310,525 B2
(45) Date of Patent: May 27, 2025

(54) COFFEE MACHINE

(71) Applicant: KONINKLIJKE PHILIPS N.V., Eindhoven (NL)

(72) Inventor: Tim Gerard Tibbe, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 940 days.

(21) Appl. No.: 17/415,002

(22) PCT Filed: Dec. 13, 2019

(86) PCT No.: PCT/EP2019/085019
§ 371 (c)(1),
(2) Date: Jun. 17, 2021

(87) PCT Pub. No.: WO2020/126876
PCT Pub. Date: Jun. 25, 2020

(65) Prior Publication Data
US 2022/0061585 A1  Mar. 3, 2022

(30) Foreign Application Priority Data

Dec. 17, 2018 (EP) ..................................... 18212970

(51) Int. Cl.
*A47J 31/52* (2006.01)
*A23F 5/26* (2006.01)
(Continued)

(52) U.S. Cl.
CPC ................ *A47J 31/52* (2013.01); *A23F 5/26* (2013.01); *A47J 31/34* (2013.01); *A47J 31/42* (2013.01);
(Continued)

(58) Field of Classification Search
CPC ........ A47J 31/52; A47J 31/461; A47J 31/468; A47J 31/34; A47J 31/42; A47J 31/4428; A47J 31/4489; A23F 5/26
See application file for complete search history.

(56) References Cited

U.S. PATENT DOCUMENTS 4,809,594 A * 3/1989 Vitous ..................... A47J 31/56
426/433
5,207,148 A * 5/1993 Anderson ............. A47J 31/525
99/290

(Continued)

FOREIGN PATENT DOCUMENTS

CN  101147651 A  3/2008
CN  102556531 A  7/2012
(Continued)

OTHER PUBLICATIONS

Extended European Search Report issued in connection with corresponding EP Application No. 18212970.0 dated Apr. 5, 2019.
(Continued)

*Primary Examiner* — Brian W Jennison
(74) *Attorney, Agent, or Firm* — Maschoff Brennan

(57) ABSTRACT

A coffee machine is for brewing coffee in a brewing chamber and has a waste bin for collecting coffee grinds after brewing and a drip tray for collecting waste water. A sensor system is provided for detecting manual removal of the waste bin and/or the drip tray and a count is made of the number of brews since the last removal of the waste bin and/or drip tray. Information is then displayed showing the number of brews, or the fraction of brews compared to a nominal maximum number of brews, since the last removal.

17 Claims, 3 Drawing Sheets

(51) Int. Cl.
*A47J 31/34* (2006.01)
*A47J 31/42* (2006.01)
*A47J 31/44* (2006.01)
*A47J 31/46* (2006.01)

(52) U.S. Cl.
CPC ....... *A47J 31/4428* (2013.01); *A47J 31/4489* (2013.01); *A47J 31/461* (2018.08); *A47J 31/468* (2018.08)

(56) References Cited

U.S. PATENT DOCUMENTS

| | | |
|---|---|---|
| 5,395,515 A | 3/1995 | Ford |
| 5,889,684 A | 3/1999 | Ben-David et al. |
| 6,085,638 A * | 7/2000 | Mork .................... A47J 31/542 |
| | | 392/480 |
| 6,182,555 B1 | 2/2001 | Scheer et al. |
| 2004/0118294 A1 | 6/2004 | Grassedonio |
| 2005/0247206 A1* | 11/2005 | Lyall, III ................ A47J 31/52 |
| | | 99/280 |
| 2011/0111107 A1 | 5/2011 | Rahn et al. |
| 2014/0263432 A1* | 9/2014 | Jacobs .................. B67D 7/3209 |
| | | 222/65 |

FOREIGN PATENT DOCUMENTS

| | | |
|---|---|---|
| CN | 104997409 A | 10/2015 |
| CN | 107951393 A | 4/2018 |
| EP | 3409148 A1 | 12/2018 |
| WO | 2016139324 A1 | 9/2016 |
| WO | 2018204727 A1 | 11/2018 |

OTHER PUBLICATIONS

International Search Report and Written Opinion issued in connection with corresponding PCT Application No. PCT/EP2019/085019 dated Feb. 14, 2020.

* cited by examiner

COFFEE MACHINE

CROSS-REFERENCE TO RELATED APPLICATIONS

The present application is a U.S. National Phase application under 35 U.S.C. §371 of International Application No. PCT/EP2019/085019, filed on Dec. 13, 2019, which claims the benefit of European Patent Application No. 18212970.0, filed on Dec. 17, 2018. These applications are hereby incorporated by reference herein.

FIELD OF THE INVENTION

This invention relates to coffee machines, and in particular (but not exclusively) to fully automated bean-to cup espresso coffee machines.

BACKGROUND OF THE INVENTION

An espresso coffee machine typically comprises a brewing chamber in which coffee grinds are provided, optionally prepackaged in a capsule, pod, or the like disposable cartridge. The machine passes pressurized hot water through the coffee grinds to create an espresso coffee drink.

A fully automatic (bean-to-cup) espresso machine further comprises a grinder, so that the machine performs the full function of coffee beans grinding and espresso drink formation.

After the coffee brewing, the left-over coffee (i.e. grinds or capsule) is disposed into a waste bin inside the appliance, as well as some waste water. The waste bin needs to be emptied periodically, but not after each brew. Instead, the waste bin is typically able to hold the left-over coffee and waste water from a certain number of brews, although the size of the waste bin does not correspond to an exact or indeed consistent number of brews.

The coffee brewing cycle also results in waste water being provided to a drip tray. For example, in some coffee machine designs, water will be provided to the drip tray during a start up rinsing cycle (to clean and heat up the brewing chamber), and during a shut-off rinse (to clean the brewing chamber).

If the waste bin or the drip tray is over-filled, a mess will result which the user will need to clean up.

It is known to provide an indication of when a drip tray is full. There are mechanical float devices which provide a visual indication and there are approaches based on sensing water levels, for example as disclosed in US 2014/0263432. This requires an additional level sensor.

However, level sensing for a waste bin in an espresso machine is less simple since the waste is not a liquid.

It is known for the coffee machine to count the number of brews from the last moment the waste bin (or drip tray) was emptied. It is known to provide a warning signal indicating that the bin is full, when the number of brews reaches a particular threshold.

However, this may come at an inconvenient time for the user.

SUMMARY OF THE INVENTION

The invention is defined by the claims.

According to examples in accordance with an aspect of the invention, there is provided a coffee machine comprising:
  a water supply;
  a water heater for heating water;
  a pump for pumping the heated water;
  a brewing chamber for receiving coffee grinds and brewing coffee using hot water delivered by the pump;
  a waste bin for collecting coffee grinds after brewing;
  a drip tray;
  a sensor system for detecting manual removal of the waste bin and/or drip tray;
  a user interface comprising a display; and
  a controller,
  wherein the controller is adapted to determine a number of brews, and to control the display to display information relating to the number of brews, or the fraction of brews compared to a nominal maximum number of brews, since the last removal of the waste bin and/or drip tray.

This coffee machine is preferably for producing espresso coffee, based on the use of a brewing chamber in which the coffee grinds (optionally prepackaged in a disposable capsule, pod, or the like), are received. The used coffee or coffee waste (grinds or capsule) is provided to a waste bin and waste water or spilled water is provided to a drip tray. To assist the user in deciding when to empty and clean the waste bin and/or the drip tray, either when they are full or in advance, information relating to the number of brews is displayed. This information can be collected in a simple manner without needing additional sensors, since this information is already available to the controller, which controls the brewing cycles. The information enables the user to judge how near the waste bin and/or the drip tray need emptying.

Note that the number of brews may be displayed as a count down. For example if the maximum number of brews is 10, the first brew may be displayed as 10, the second as 9 etc. The output may still be considered to show the number of brews (in that each displayed output corresponds to the number of brews in a one-to-one manner known by the user).

The waste bin is typically filled by a known amount for each brewing cycle, so that a count of brewing cycles provides a reasonable estimate of how full the waste bin has become. The drip tray is also filled at a rate which is a function of the number of brew cycles, since each brew cycle contributes a typical amount of waste water to the drip tray. The largest part of the contribution to the filling of the drip tray is for example during a start up rinsing cycle, during a shut-off rinsing cycle, and during optional cooling cycles after steam generation (in cases where the coffee machine is equipped with a steam supply function, for heating and/or frothing milk). Thus, the amount of water in the drip tray is also largely dependent on the number of brewing cycles. Thus, an estimate is also possible of the amount of filling of the drip tray, again without needing the expense of a level sensor. A full indicator may still be provided, and this means that any inaccuracy in the estimate does not matter, since a drip tray full warning can also be given. A full indicator may be a low cost mechanical component such as a float.

Preferably, the sensor system is at least for detecting manual removal of the waste bin and the display information shows the number of brews, or the fraction of brews compared to a nominal maximum number of brews, since the last removal of the waste bin. This provides a low cost level sensing solution for the waste bin.

The waste bin and the drip tray may be removable from the coffee machine as a single unit, so that only one sensing system is needed. There may however be a separate sensor for sensing removal of the drip tray if they are instead separately removable vessels.

The drip tray and the waste bin may be designed for emptying together or separately.

The waste bin preferably has a volume suitable for collecting used coffee from a plurality of brewing steps. Thus, the emptying and cleaning is only needed every several brewing steps.

For example, the waste bin may have a volume suitable for collecting used coffee from at least five brewing steps.

The coffee machine preferably comprises a bean-to-cup espresso machine comprising a bean grinder. A pressurizing system may then also be provided for the brewing chamber to compress the coffee grinds.

The coffee machine may further comprise an external water delivery nozzle for delivering water from the pump which has not passed to the brewing chamber. This may be used to provide hot water for making other drinks.

The water heater is preferably further controllable to generate steam. The steam output enables heating and frothing of milk to enable a cappuccino (or latte or other drinks) to be made.

For this purpose, the coffee machine further comprises a steam outlet. The steam outlet may be separate to the external water delivery nozzle, or it may be the external water delivery nozzle (which can thus deliver steam or hot water).

The coffee machine preferably further comprises a milk frothing unit for coupling to the steam outlet.

BRIEF DESCRIPTION OF THE DRAWINGS

Examples of the invention will now be described in detail with reference to the accompanying drawings, in which.

DETAILED DESCRIPTION OF THE EMBODIMENTS

Figure 1A:
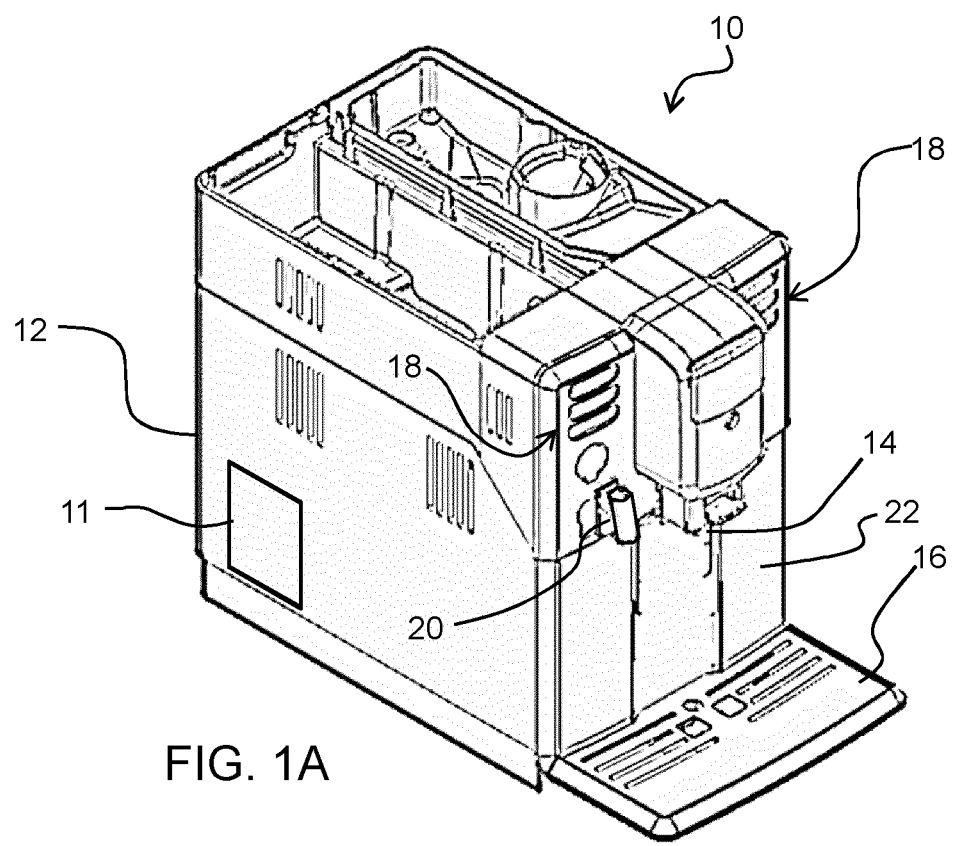
FIGS. 1A and 1B show a full function espresso coffee machine.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figs are merely schematic and are not drawn to scale. It should also be understood that the same reference numerals are used throughout the Figs to indicate the same or similar parts.

The invention provides a coffee machine for brewing coffee in a brewing chamber, having a waste bin for collecting used coffee after brewing and a drip tray for collecting waste water. A sensor system is provided for detecting manual removal of the waste bin and/or the drip tray and a count is made of the number of brews since the last removal of the waste bin and/or drip tray. Information is then displayed showing the number of brews, or the fraction of brews compared to a nominal maximum number of brews, since the last removal of the waste bin and/or drip tray.

Figure 1B:
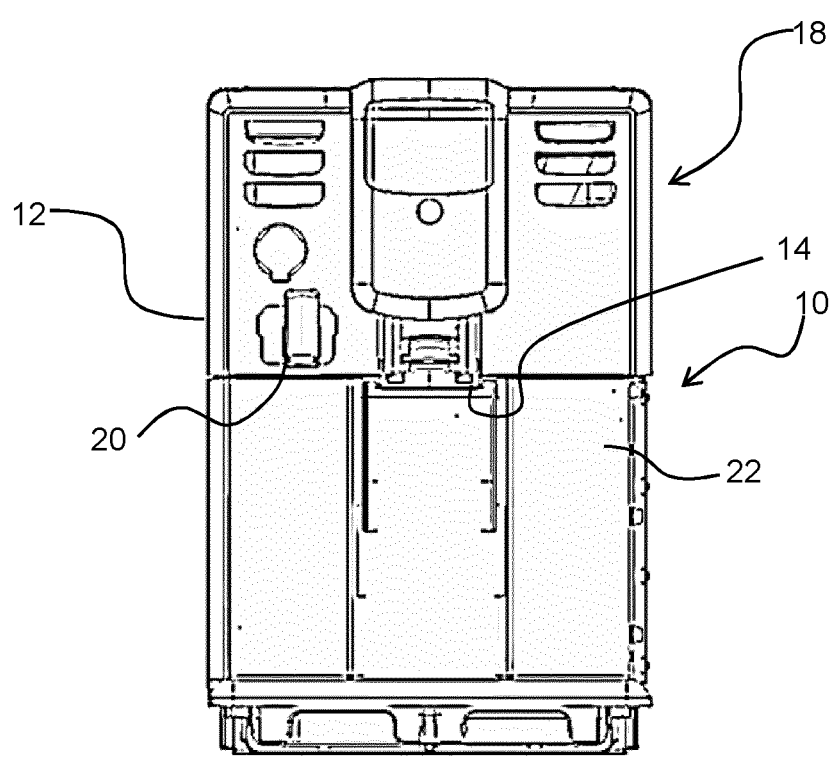

FIGS. 1A and 1B shows a drinks machine 10 in the form of an espresso coffee machine. FIG. 1A shows a perspective view and FIG. 1B shows a view from in front. The illustrated coffee machine is a bean-to-cup system.

It comprises a main body 12, which houses a water reservoir, a water heater and a reservoir for receiving coffee beans. There is an internal grinding mechanism for creating coffee grind, a brewing chamber or brew group for receiving the coffee grind, a pressurizing system for compressing the grinds, and a pumping system for pumping heated water through the (compressed) coffee grinds.

The machine comprises a coffee output 14 from which the espresso drink is output, after the hot water has been pumped through the coffee grinds. The coffee output 14 faces downwardly and is located over a drip tray 16. FIGS. 1A and 1B also show a user interface 18 for receiving user selections, such as for water selection and for other drinks selections. There is also an external water delivery nozzle 20 for delivering water (or steam) from the pump which has not passed to the brewing chamber.

The coffee machine has a waste bin 22, which in the illustrated embodiment may be accessed from the front of the machine, in the form of a pull-out drawer. After the brewing process, the used coffee grinds together with some excess water are discharged into the waste bin.

In addition to an espresso coffee mode for delivering coffee from the coffee output 14, the output nozzle 20 may enable a hot water mode and/or a steam mode. Some of the drinks selections relate to drinks recipes which include hot and/or frothed milk and therefore require the generation of steam. For this purpose, steam may be provided from the output nozzle 20. There may also be an option for the generation of steam without being part of a drink selection, for example to enable the user to generate heated and/or frothed milk independently of any drink to be made by the machine.

The operation of the machine in generating an espresso coffee drink is entirely conventional, and the general operation of the coffee machine will not be described further.

Apart from the automated actions carried out by the machine, some user actions are also needed:

Refilling water after a certain amount of brews;

Refilling the coffee beans after a certain number of brews (but this number is not a constant since it depends on the type of brew);

Emptying the waste bin after a certain number of brews (but again this number is not a constant since it depends on the type of brew); and Emptying the drip tray after a certain number of brews. The user may empty the drip tray whenever they empty the waste bin, but this is not necessarily the case.

For the non-visible components, like the waste bin, the time when emptying is needed comes at an essentially random time as far as the user is concerned, and it may be an inconvenient time.

The invention provides an output system, which displays the number of brews, or the fraction of brews compared to a nominal maximum number of brews, since the last removal (and therefore implied emptying) of the waste bin and/or the drip tray. This output system is part of the user interface 18, which includes a display. A user is then able to decide when to perform the emptying and cleaning function to make the process most convenient for the user. For example, the user may empty the waste bin or the drip tray earlier if the user can see that one of them is likely to need emptying at a time which will be inconvenient, e.g. when entertaining guests.

The waste bin for example sits over the drip tray. They are removed together as a single unit, but they may then be emptied separately. It may suffice to provide an indication of the fill level only of one of the two vessels (preferably the one which will fill first), if it can reasonably be assumed that they will always be emptied together. Alternatively, it may be desirable to have separate fill level information for the two vessels if it is likely that they will be emptied as independent operations.

Figure 2:
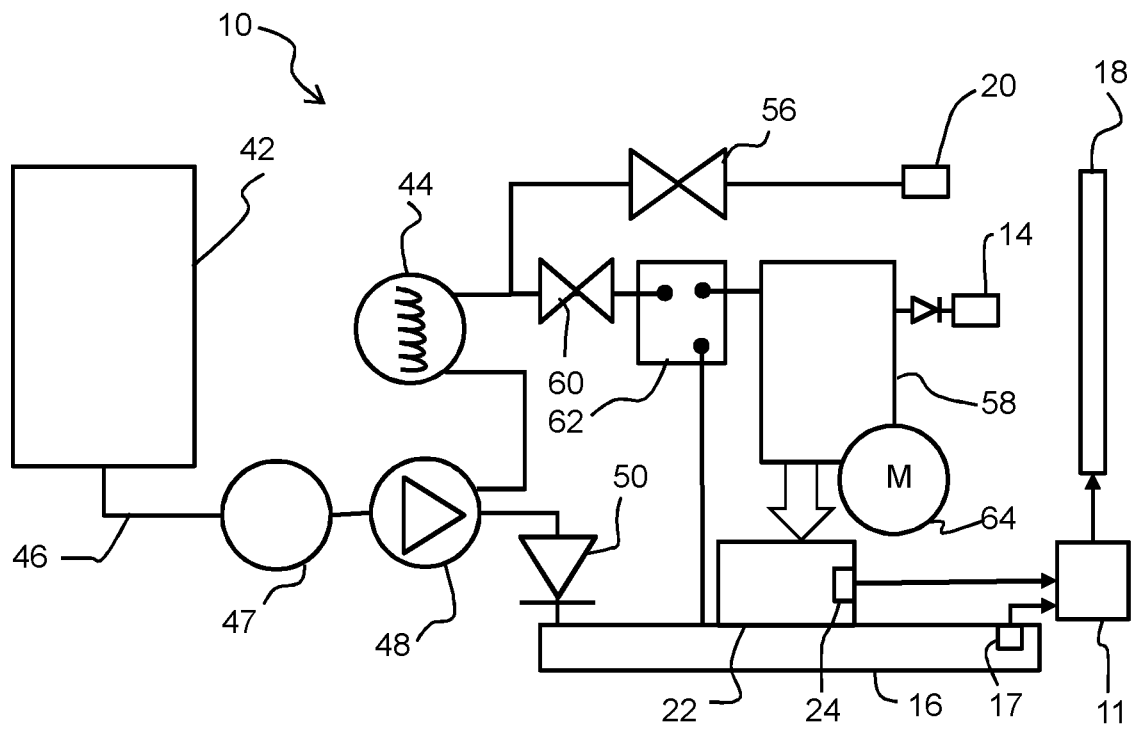
FIG. 2 shows an example of the hydraulic system of the coffee machine.

FIG. 2 shows the internal components of a full function espresso coffee machine, and in particular shows the fluid paths in the system as well as the user interface and the parts needed to implement the invention.

The coffee machine 10 comprises a water container 42, a water heater 44 for heating water to generate hot water and optionally steam, and a water pump 48 for pumping the heated water and steam. There is additionally a water dosing flow meter 47.

The pump delivers water to the heater 44. In addition, there may be an over-pressure valve 50 from the heater to the drip tray 16 for collection or discharge of waste water.

The heated steam is provided to the output nozzle 20 through a first electronic valve 56.

The coffee output 14 may have an in-line crema valve. The heated water is provided to a brewing chamber 58 through a second valve 60 and also through a control unit 62. The control unit 62 allows water to be discharged to the drip tray 16 or to the waste bin 22 for example during cooling down of the heater, to bring the heater down from steaming temperatures to coffee brewing temperatures and to guarantee that the heater is completely filled with water instead of steam.

Waste water may also pass to the drip tray during a start up rinsing cycle (to clean and heat up the brewing chamber), and during a shut off rinsing cycle (to clean the brewing chamber). This waste water is the main contributor to the filling of the drip tray, rather than the expected amount of manual spillage by the user, which also flows into the drip tray. Therefore an accurate prediction can be made of the need to empty the drip tray based on the number of brewing cycles since the last emptying.

The brewing chamber 58 may be driven by a motor 64 for driving the brewing chamber between different positions, e.g. a coffee grinds receiving position and a coffee brew position.

The coffee machine makes use of single heater 44 to selectively supply hot water of about 100° C. for brewing coffee, steam of about 140° C. (or more) for heating and/or frothing milk to the output nozzle 20, and water of about 90 degrees to the output nozzle 20 for other drink preparation (e.g. tea or hot chocolate), depending on the mode set by the user. When the machine is to prepare a milk-based recipe, e.g. a cappucino, the heater 44 may first be heated up to about 140° C. (or more) to supply steam to heat and/or froth milk. The heater may then be cooled down to about 100° C. to provide hot water for brewing coffee. During the cooling down phase from 140 to 100° C., water coming from the heater may still be too hot for brewing coffee. This water is discharged as mentioned above to the drip tray (or to the waste bin, depending on the design of the machine). For a coffee drink which does not require hot and/or frothed milk, the heater may only be heated to 100° C. and the brewing will then start without delay.

The control unit 62 is a coupling between the valve 60 and the brewing chamber 58 but in dependence on the brewing chamber position. Thus, this unit does not select between flow paths but instead it functions as a physical interrupt unit which allows or interrupts the connection between the valve 60 and the brewing chamber 58.

When the brewing chamber is in its home position (which is a rest position at which it is positioned for receiving coffee, e.g. from the grinder), the valve 60 is not connected to the brewing chamber 58 so the brewing chamber is not connected to the water supply system.

When the brewing chamber is moved from the home position to the brew position, there is a control pin which interfaces with the control unit 62, and this moves the valve 60 and configures the valve 60 to allow the fluid coupling.

An espresso coffee is typically made by forcing pressurized water to flow through a quantity of coffee grinds.

During an espresso making process, the coffee grinds are compressed. To this end, the machine may for example comprise a piston, which is movably arranged in a cylindrical brewing chamber, and which is capable of sealing an open top side of the brewing chamber.

Movement of the piston controls the extent of compression of the coffee grinds. When the coffee grinds are compressed more and more, a flow-through resistance of the coffee grinds increases. During an espresso making process, a brewing pressure at which the process is performed, i.e. a pressure at which the water is conducted through the coffee grind, is determined by the flow through resistance of the coffee grinds.

The brewing pressure is a determining factor for important characteristics of the espresso drink, including the taste, and the texture of a foam layer. The brewing pressure is thus for example controlled by varying a position of the piston and/or the water flow.

After coffee brewing, the used coffee grinds are discharged to the waste bin 22. The brewing chamber may be removably arranged in order to facilitate emptying and cleaning of the brewing chamber.

The waste bin has a sensor 24 which enables detection of the removal of the waste bin from the main body of the coffee machine. There may be a switch (a push switch or a magnetically controlled switch such as a Hall sensor or any other contact or proximity sensor) which is activated when the waste bin drawer is inserted and/or when it is removed.

The drip tray 16 may also have a sensor 17 which enables detection of the removal of the drip tray from the main body of the coffee machine. This is in particularly advantageous for a design in which the drip tray and the waste bin are independently removable.

Thus, a manual waste bin and/or drip tray removal can be detected. This includes detecting the removal itself, or detecting the subsequent re-insertion of the waste bin and/or drip tray (which therefore must have been preceded by a removal) or separate detection of both operations.

The coffee machine has a controller 11 which counts the number of brewing cycles, starting from each detected removal. Each removal is assumed to correspond to emptying of the waste bin or drip tray as the case may be. The waste bin is thus assumed to be empty when re-inserted and similarly the drip tray is assumed to be empty when re-inserted.

The counting of the number of brewing steps performed is routine since the controller is involved in controlling the various components during the brewing process, namely the brew chamber position and any active valves.

A nominal maximum number of brewing steps is assumed corresponding to filling of the waste bin. This maximum number is for example in the range 5 to 20, for example 5 to 15. By way of example only, a maximum number of brewing steps is taken to be 8 in the examples below.

Similarly, a nominal maximum number of brewing steps is assumed corresponding to filling of the drip tray. This maximum number may be the same or different to the number of removals of the waste bin. For example it may be in the range 5 to 24, for example 10 to 20.

The operation will be described with reference to the waste bin, but the same procedure may be applied to the drip tray.

The controller is adapted to control the display of the user interface 18 to display information showing the number of brews, or the fraction of brews compared to the nominal maximum number of brews, since the last removal of the waste bin.

FIGS. 3 to 7 show some possible formats for the display output to show the level in the waste bin.

Figures 3, 4:
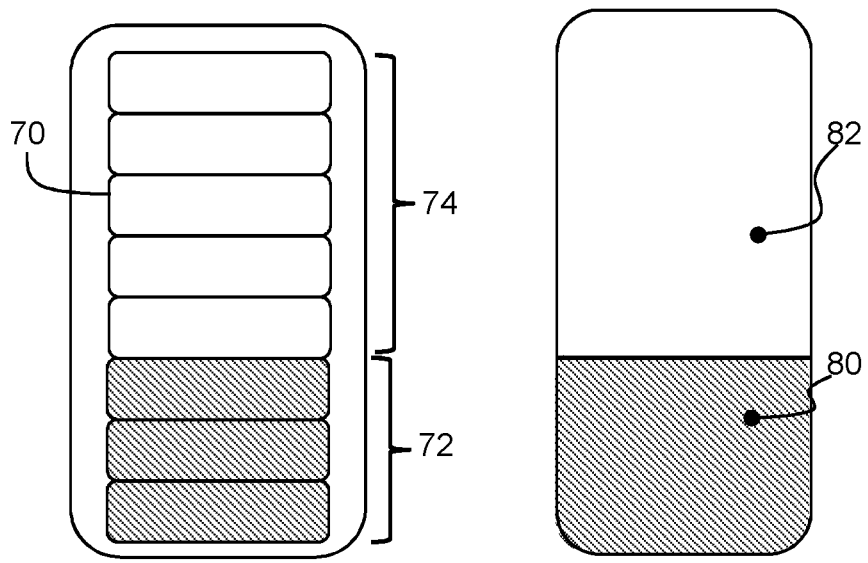
FIGS. 3 to 7 show various possible ways of displaying information relating to the level of filling of the waste bin and/or drip tray.

In FIG. 3, the number of brews is represented as a stack of eight elements 70. The bottom three 72 are illuminated, or given one color (e.g. red) and the top five 74 are non-illuminated or given a different color (e.g. green). This display thus shows the number of brews (three in this example), since the last removal of the waste bin. It also shows the maximum number of brews (eight in this example) and hence the remaining number of brews before emptying is needed (five in this example).

In FIG. 4, the number of brews is represented as an analog filling level. The bottom three eighths 80 are illuminated, or given one color (e.g. red) and the top five eighths 82 are non-illuminated or given a different color (e.g. green). This display thus shows the fraction of brews compared to a nominal maximum number of brews (three eighths).

Figure 5:
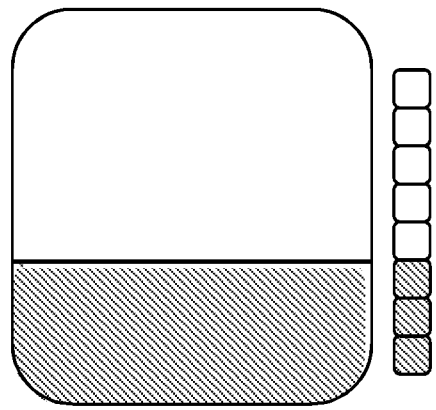

FIG. 5 shows a display which combines the information of FIGS. 3 and 4. Thus it shows the fraction in an easily visible way as well as the actual number of brewing steps already performed and the actual number remaining.

Figure 6:
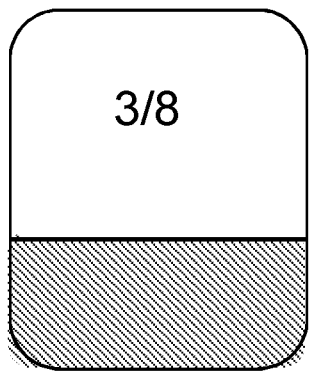

FIG. 6 shows a display which combines the information of FIG. 4 with a numeric indication of the value of the fractional amount. In this way it can also be seen how many brews remain before the waste bin is full (or more accurately, is likely to be full) as a numeric indicator rather than the graphical indicator of FIG. 5.

Figure 7:
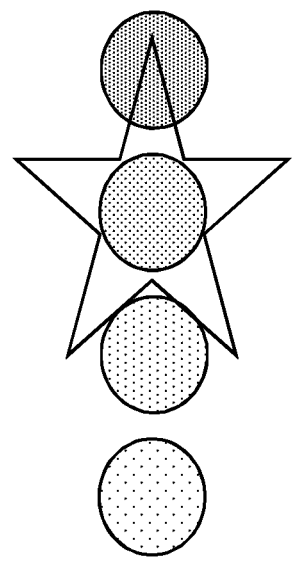

FIG. 7 shows a traffic light system, where each light represents a quarter filling state. The third light up out of four is illuminated (and it may have a particular color, such as progressively more red) indicating a ¾ full state.

Similar display information may be provided for the drip tray. As mentioned above, there may be separate level information for the drip tray and for the waste bin. Alternatively, one level output suffices, particularly if the drip tray and waste bin are emptied at the same time. Indeed, the drip tray and waste bin may be designed such that there is only one common emptying step.

The coffee maker may comprise any suitable type of water heater for heating the water, for example a thermoblock or through flow heater. It may comprise an additional heater for generating steam or assisting the first heater to generate steam.

The invention is of particular interest to fully automatic coffee machines as described above that create a coffee beverage by automatically grinding coffee beans, compressing the coffee, and pumping hot pressurized water through the coffee. Furthermore, such coffee machines have the possibility to create milk-based beverages by heating and/or frothing milk by means of steam. These machines are known as full function bean-to-cup espresso machines.

However, the invention can be applied generally to any drinks machine which has an internal coffee brewing chamber and a waste bin for collecting the used coffee after brewing. The invention is of interest as long as the waste bin holds more waste than results from a single brew (since in that case the user would simply empty and clean after each brew).

For example, the invention may be applied to a coffee machine which receives pre-ground coffee or a coffee machines that makes use of capsules, pods or the like, and wherein the used capsules, pods, etc. are discharged into a waste bin arranged inside the machine.

The machine may have an internal or external water reservoir or may be plumbed in.

In the example above, the drip tray has a sensor 17 for detecting removal of the drip tray. If the drip tray and waste bin are removed as a coupled single unit, then of course only one sensor is needed.

Instead, the drip tray may have a liquid level sensor, so that a drip tray water level may also be output on the display as a measured output rather than an estimate based on the number of brewing cycles. A liquid level sensor for the drip tray is lower cost than a level sensor for the waste bin because the waste bin is not filled with a liquid and hence the level measurement would be more complex, for example needing a weight sensor. The use of counting for the waste bin is thus a particularly low cost solution, avoiding the need for additional sensors.

The water level in the water supply 42 may be sensed and optionally the amount of coffee beans, for example based on a weight sensor.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A coffee machine comprising:
   a water supply;
   a water heater for heating water;
   a pump for pumping the heated water;
   a brewing chamber for receiving coffee grinds and brewing coffee using the heated water delivered by the pump;
   a waste bin for collecting coffee grinds after brewing;
   a drip tray;
   a sensor system for detecting manual removal of the waste bin and/or drip tray;
   a user interface comprising a display; and
   a controller,
   wherein the controller is adapted to determine a number of brews, and to control the display to display information relating to the number of brews, or a fraction of brews compared to a nominal maximum number of brews, since the last removal of the waste bin and/or drip tray and in advance of the waste bin and/or drip tray being full.

2. The coffee machine of claim 1, wherein the sensor system is at least for detecting the manual removal of the waste bin and the displayed information shows the number of brews, or the fraction of brews compared to the nominal maximum number of brews, since the last removal of the waste bin.

3. The coffee machine of claim 1, wherein the waste bin has a volume suitable for collecting coffee waste from a plurality of brews.

4. The coffee machine of claim 1, wherein the waste bin has a volume suitable for collecting coffee waste from at least five brews.

5. The coffee machine of claim 1, wherein the waste bin and the drip tray are removable from the remainder of the coffee machine as a single unit.

6. The coffee machine of claim 1, wherein the waste bin and the drip tray are adapted for emptying together or separately.

7. The coffee machine of claim 1, further comprising a bean grinder.

8. The coffee machine of claim 7, further comprising a pressurizing system for the brewing chamber.

9. The coffee machine of claim 1, further comprising an external water delivery nozzle for delivering water from the pump which has not passed to the brewing chamber.

10. The coffee machine of claim 1, wherein the water heater is further controllable to generate steam.

11. The coffee machine of claim 9, further comprising a steam outlet.

12. The coffee machine of claim 11, wherein the steam outlet is either separate to the external water delivery nozzle, or is the external water delivery nozzle.

13. The coffee machine of claim 11, further comprising a milk frothing unit for coupling to the steam outlet.

14. The coffee machine of claim 1, wherein the displayed information relating to the number of brews comprises a count of the number of brews or a count down from the nominal maximum number of brews.

15. The coffee machine of claim 1, wherein the information relating to the number of brews is displayed in advance of the waste bin and/or drip tray being full.

16. The coffee machine of claim 1, further comprising a valve, wherein the heated water is provided to the brewing chamber through the valve, and wherein the valve is coupled to the brewing chamber based on a position of the brewing chamber.

17. A coffee machine comprising:
a pump for pumping hot water;
a brewing chamber for receiving coffee grinds and brewing coffee using the hot water delivered by the pump;
a waste bin for collecting coffee grinds after brewing;
a drip tray;
a sensor system for detecting manual removal of the waste bin and/or drip tray;
a user interface comprising a display; and
a controller,
wherein the controller is adapted to control the display to display a count of information relating to a number of brews, or a fraction of brews compared to a nominal maximum number of brews, since the last removal of the waste bin and/or drip tray and in advance of the waste bin and/or drip tray being full.

* * * * *